United States Patent

Furusawa et al.

[11] 4,352,543
[45] Oct. 5, 1982

[54] LENS BARREL

[75] Inventors: Motoyoshi Furusawa, Shyobu; Shigemitsu Mori, Omiya, both of Japan

[73] Assignee: Fuji Photo Optical Co., Ltd., Japan

[21] Appl. No.: 169,781

[22] Filed: Jul. 17, 1980

[30] Foreign Application Priority Data

Jul. 21, 1979 [JP] Japan .................................. 54/93100

[51] Int. Cl.³ .............................................. G02B 7/02
[52] U.S. Cl. .................................................. 350/252
[58] Field of Search ...................... 350/252, 255, 257

[56] References Cited

U.S. PATENT DOCUMENTS 3,904,278  9/1975  Hummel .............................. 350/255

FOREIGN PATENT DOCUMENTS 1188586  4/1970  United Kingdom ................ 350/252

Primary Examiner—F. L. Evans

[57] ABSTRACT

In a lens barrel for a photographic camera or the like employing operating rings made of synthetic resin, the operating rings are provided with slots on the periphery thereof. The slots are preferably provided to extend in the direction perpendicular to the optical axis of the lens system of the lens barrel.

4 Claims, 2 Drawing Figures

LENS BARREL

BACKGROUND OF THE INVENTION

1. Field of the Invention

This invention relates to a lens barrel of a lens system for a camera, and more particularly to a lens barrel of a lens system for a photographic camera in which at least the operating ring thereof is made of synthetic resin.

2. Description of the Prior Art

In the photographic camera, it is desirable to reduce the weight of the camera body including the lens. The lens barrel of the lens system attached to the camera is usually made of metal such as aluminium in its operating ring and lens holding ring and other parts thereof. The lens barrel including parts made of metal is heavy and is desired to be lightened by replacing the metal parts by plastics or other synthetic resin parts. By replacing the metal parts by the synthetic resin parts, not only the weight thereof is reduced but also the cost thereof is lowered.

On the other hand however, the synthetic resin parts are disadvantageous in that the manufacturing accuracy and the operational accuracy thereof are not so high as the metal parts. From this viewpoint, it has generally been practiced to use the synthetic resin parts as the distance ring, the aperture control ring, the focal length varying ring and other manually operated rings in the camera. The operating rings like these control rings made of synthetic resin do not affect the optical performance of the lens barrel. However, these rings are disadvantageous in that the operation thereof sometimes cannot be smoothly made. This is because the operating rings made of synthetic resin are easily deformed by forces applied thereto in the radial direction. Particularly when these rings are manually operated, the rings are compressed by fingers and imparted with radially inwardly acting forces. On such occasions, the internal structure of the lens barrel including members driven by the operating rings are imparted with unnecessary forces and the operation of the internal structure is not properly made or the smooth operation thereof is prevented.

For instance, the deformation or strain of the distance ring made in the axial direction and the radial direction imparts an abnormal external force to a helicoid mechanism used for converting a rotating movement of the operating ring to an axial movement of the lens mounted therein. Consequently, a very large operating force is required to rotate the distance ring and the smooth operation thereof is prevented.

SUMMARY OF THE INVENTION

The object of the present invention is to provide a lens barrel for a camera in which synthetic resin is used for various parts including operating rings and the operation can be smoothly made.

The above objects is accomplished by providing slots on the peripheral surface of the operating ring of the lens barrel made of synthetic resin.

The lens barrel in accordance with the present invention can be used not only for a photographic camera but also for any other optical instruments using a lens barrel such as telescopes, binoculars and so forth.

DESCRIPTION OF THE PREFERRED EMBODIMENT

Now the present invention will be described in detail with reference to FIGS. 1 and 2 in which the distance ring or focusing ring of a lens barrel is made of synthetic resin.

Figure 1:
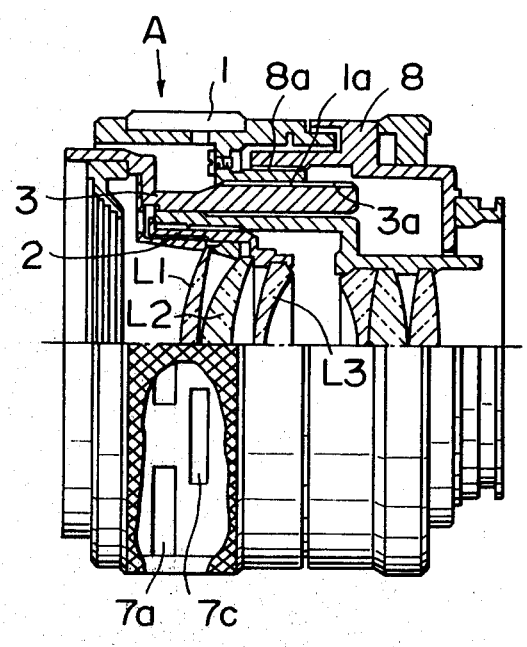
FIG. 1 is a longitudinal sectional view of a lens barrel in accordance with an embodiment of the present invention taken along the optical axis of the lens system thereof.

The lens barrel as shown in FIG. 1 is a lens barrel for an interchangeable lens for a single lens reflex camera. The operating ring for controlling the position of the lens system with respect to the distance of an object, so-called forcusing ring 1 is made of a synthetic resin such as polycarbonate containing glass or polybutadiene polyphthalate. The focusing ring 1 is screw engaged with a helicoid cylinder 3 having therein fixed thereto a lens holding ring 2 which holds a lens group L1, L2 and L3 for controlling focus with respect to the distance of the object. By the screw engagement of the helicoid screw 1a of the focusing ring 1 with the helicoid screw 3a of the helicoid cylinder 3, the rotating movement of the focusing ring 1 is converted to an axial linear movement of the helicoid cylinder 3 and accordingly of the lens group retained in the lens holding ring 2.

Figure 2:
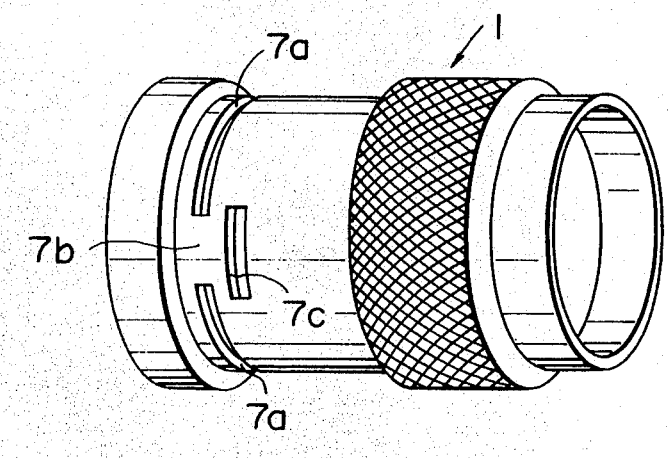
FIG. 2 is a perspective view of a focusing ring used in the lens barrel in accordance with an embodiment of the present invention as shown in FIG. 1.

The focusing ring 1 of the lens barrel in accordance with the present invention as shown in FIG. 1 is provided on the peripheral surface thereof with a plurality of slots 7a as shown in FIG. 2. The slots 7a extend in the direction perpendicular to the optical axis of the lens system retained therein. The width and length of the slots 7a may be properly determined in view of various factors including the material, shape and strength of the focusing ring 1. The slots may be provided only along one circumferential line like slots 7a. In such a case, the slots 7a are preferably provided at equal intervals, though it is not indispensable. Further, more preferably, there are provided other slots 7c at the position beside the area 7b between said slots 7a with both ends of the slots 7c slightly overlapped with the slots 7a. With this arrangement of the additional slots 7c, the deformation of the focusing ring 1 can be effectively prevented even when the external compressive force A is applied to said area between the first line of slots 7a.

When an external force A is applied on the focusing ring 1 by the fingers of the photographer and the force A is so large as to deform the focusing ring 1, the focusing ring 1 is deformed only partially at the areas around the slots 7a and 7c and the other part of the ring 1 is not deformed or strained because the deformation is absorbed by the slots 7a and 7c.

Without the slots 7a or 7c, the deformed focusing ring 1 imparts an abnormal force to the screws 1a and 3a and/or the screw engaging portion 8a between the focusing ring 1 and a fixed cylinder 8.

Particularly when the focusing ring 1 is long in the direction of the optical axis, there is a high possibility of deformation of the focusing ring. In such a case, the number of lines of said slots 7a, 7c is desired to be increased.

It will be noted that the above described embodiment is a mere example of the lens barrel in accordance with the present invention. The focusing ring may be replaced by other operating rings such as an aperture control ring, a zooming ring for varying the focal length of the lens and a film sensitivity setting ring. Further, the lens barrel may not be of an interchangeable lens but may be of an ordinary lens for a viewfinder camera, or further may be of other optical instruments such as a telescope or binoculars.

We claim:

1. A lens barrel for a lens system in an optical instrument comprising a driven member, and an operating ring made of synthetic resin having a driving portion operatively engaged with said driven member for driving the driven member and an operating portion imparted with a driving force for driving said driven member, said driving portion and said operating portion being located in different positions in the direction of the optical axis of the lens system in the lens barrel characterized in that said operating ring is provided on said operating portion or on the periphery of the operating ring between said operating portion and said driving portion with a plurality of slots extending in a plane perpendicular to the optical axis of the lens system.

2. A lens barrel as defined in claim 1 wherein said plurality of slots are provided in a plurality of lines of slots around said periphery surface.

3. A lens barrel as defined in claim 2 wherein said slots in one of said lines are positioned adjacent to areas between adjacent slots in another line adjacent to said line in which said slots are included.

4. A lens barrel as defined in any one of claims 1, 2 or 3 wherein said slots are provided at equal intervals along one or more circumferential lines.

* * * * *